(12) United States Patent
Jung et al.

(10) Patent No.: US 11,337,058 B2
(45) Date of Patent: May 17, 2022

(54) ELECTRONIC DEVICE AND METHOD FOR OPERATING THEREOF

(71) Applicant: Samsung Electronics Co., Ltd., Suwon-si (KR)

(72) Inventors: Dongsuk Jung, Suwon-si (KR); Sukkyung Yoon, Suwon-si (KR); Eunseok Yang, Suwon-si (KR); Daejun Kang, Suwon-si (KR); Keonyoung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/247,929

(22) Filed: Dec. 30, 2020

(65) Prior Publication Data
US 2021/0204111 A1 Jul. 1, 2021

(30) Foreign Application Priority Data
Dec. 31, 2019 (KR) .......................... 10-2019-0180085

(51) Int. Cl.
*H04B 1/38* (2015.01)
*H04W 8/18* (2009.01)
*H04W 60/00* (2009.01)
*H04W 76/15* (2018.01)
*H04W 8/24* (2009.01)

(52) U.S. Cl.
CPC .............. *H04W 8/183* (2013.01); *H04W 8/24* (2013.01); *H04W 60/00* (2013.01); *H04W 76/15* (2018.02)

(58) Field of Classification Search
None
See application file for complete search history.

(56) References Cited

U.S. PATENT DOCUMENTS

| 10,433,368 B2 | 10/2019 | Chien et al. | |
| 10,567,953 B1* | 2/2020 | Kumar | H04W 88/06 |
| 2012/0190362 A1 | 7/2012 | Subbarayudu et al. | |
| 2016/0095157 A1* | 3/2016 | Wenzel | H04L 69/325 |
| | | | 370/329 |

(Continued)

OTHER PUBLICATIONS

International Search Report and Written Opinion of the International Searching Authority in connection with International Application No. PCT/KR2020/018988 dated Apr. 8, 2021, 9 pages.

*Primary Examiner* — Gary Lafontant

(57) ABSTRACT

An electronic device may include a first subscriber identity module (SIM), a second SIM, a communication circuit, a memory, and a processor. According to an embodiment, the memory may store instructions that when executed, cause the processor to set the first SIM to a SIM associated with a data service, and the second SIM to a SIM irrelevant to the data service to determine first capability information associated with a function supported by the electronic device in connection with the first SIM, and second capability information associated with a function supported by the electronic device in connection with the second SIM. The instructions may also cause the processor to transmit the first and second capability information to the network, and to receive allocation of a resource for wireless communication corresponding to each of the first and second SIM from the network, based on the first and the second capability information.

18 Claims, 10 Drawing Sheets

(56) References Cited

U.S. PATENT DOCUMENTS

| | | |
|---|---|---|
| 2017/0280366 A1 | 9/2017 | Sahu et al. |
| 2017/0280507 A1 | 9/2017 | Wang |
| 2018/0084504 A1 | 3/2018 | Lindoff et al. |
| 2018/0160422 A1 | 6/2018 | Pathak et al. |
| 2019/0014542 A1 | 1/2019 | Jain et al. |

* cited by examiner

ELECTRONIC DEVICE AND METHOD FOR OPERATING THEREOF

CROSS-REFERENCE TO RELATED APPLICATION

This application is based on and claims priority under 35 U.S.C. § 119 to Korean Patent Application No. 10-2019-0180085, filed on Dec. 31, 2019, in the Korean Intellectual Property Office, the disclosure of which is incorporated by reference herein its entirety.

BACKGROUND

1. Field

The disclosure relates to an electronic device including a plurality of subscriber identification modules and a method of operating the electronic device.

2. Description of Related Art

With recent developments in technology, the field of a mobile communication system has been continuously developed to 5G communication beyond 4G mobile communication technology (e.g., long term evolution (LTE) or long term evolution advanced (LTE-A)). An electronic device may provide a communication service to a user, using a subscriber identity module (SIM) in which information of a mobile communication subscriber is stored. In particular, the electronic device may include a plurality of SIMs to selectively provide the user with the desired communication service depending on the situation.

The above information is presented as background information only to assist with an understanding of the disclosure.

SUMMARY

In an electronic device including a plurality of SIMs, even when only the single SIM is actually used in a data slot, in the case where unnecessary resources are allocated to all SIMS, power may be consumed unnecessarily and an adverse effect may have on the operation of the electronic device.

Aspects of the disclosure are to address at least the above-mentioned problems and/or disadvantages and to provide at least the advantages described below. Accordingly, an aspect of the disclosure is to provide an electronic device capable of preventing unnecessary resources from being allocated from a network.

In accordance with an aspect of the disclosure, an electronic device may include a first subscriber identity module (SIM), a second SIM, a communication circuit, a memory, and a processor operatively connected to the first SIM, the second SIM, the communication circuit, and the memory. According to an embodiment, the memory may store instructions that, when executed, cause the processor to set the first SIM to a SIM associated with a data service, and set the second SIM to a SIM irrelevant to the data service, to determine first capability information associated with a function supported by the electronic device in connection with the first SIM, and second capability information associated with a function supported by the electronic device in connection with the second SIM, which are to be transmitted to a network, based on whether the first SIM or the second SIM is set as the SIM associated with the data service, to transmit the first capability information and the second capability information to the network through the communication circuit, and to receive allocation of a resource for wireless communication corresponding to each of the first SIM and the second SIM from the network through the communication circuit based on the first capability information and the second capability information.

In accordance with another aspect of the disclosure, an operating method of an electronic device including a first SIM and a second SIM may include setting the first SIM to a SIM associated with a data service, and setting the second SIM to a SIM irrelevant to the data service, determining first capability information associated with a function supported by the electronic device in connection with the first SIM, and second capability information associated with a function supported by the electronic device in connection with the second SIM, which are to be transmitted to a network, based on whether the first SIM or the second SIM is set as the SIM associated with the data service, transmitting the first capability information and second capability information to the network through a communication circuit, and receiving allocation of a resource for wireless communication corresponding to each of the first SIM and the second SIM from the network through the communication circuit based on the first capability information and the second capability information.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
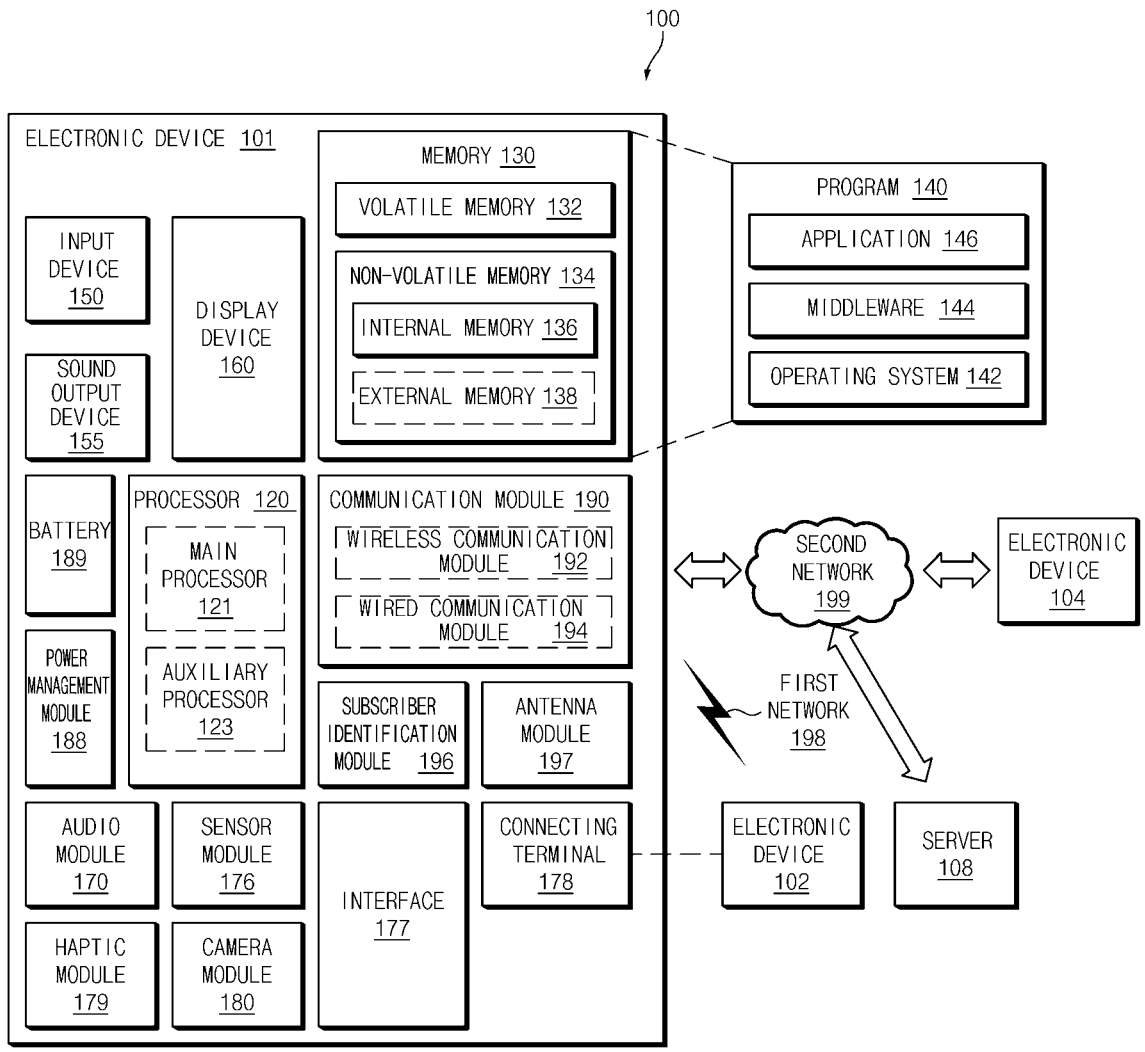
FIG. 1 illustrates a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
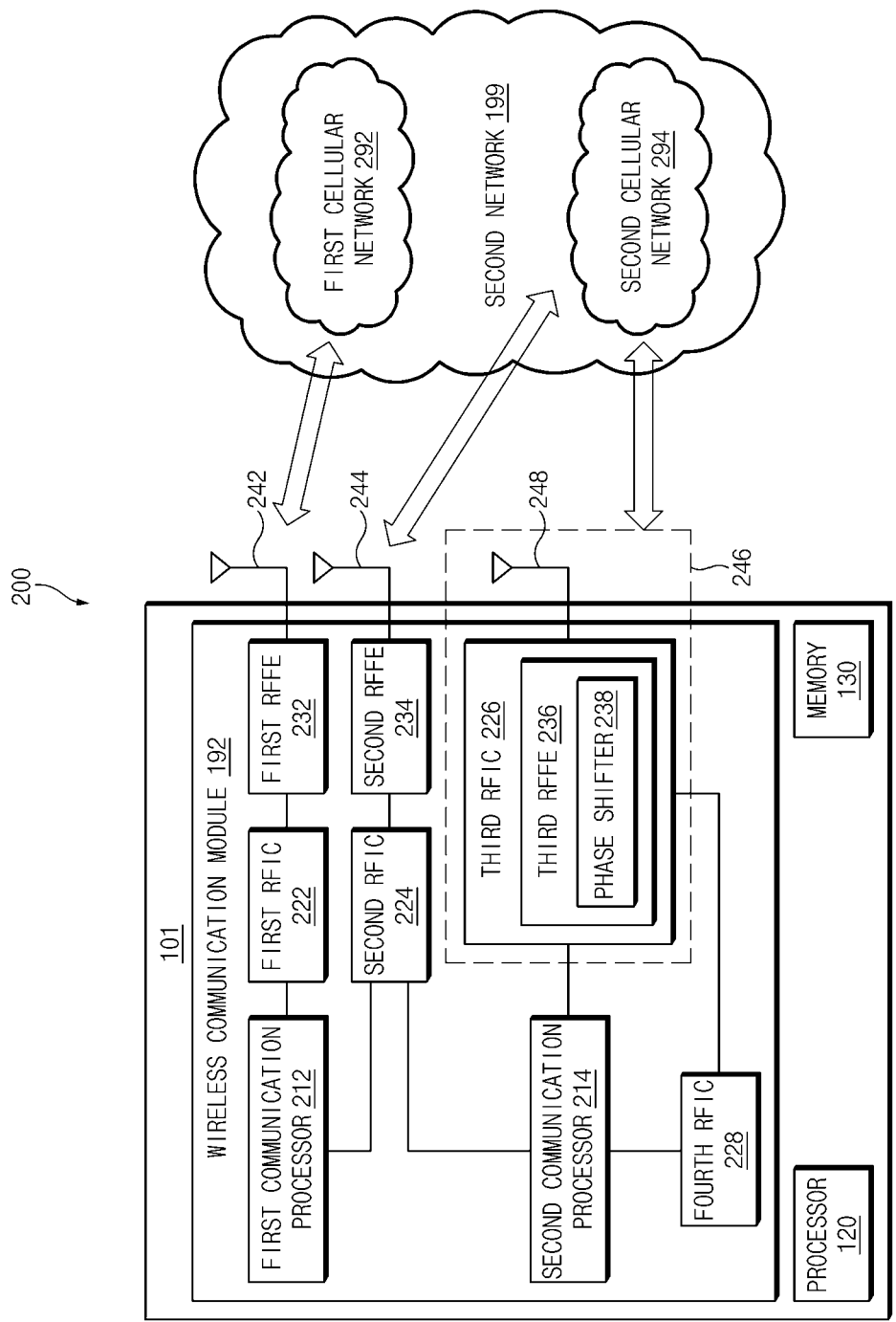
FIG. 2 illustrates a block diagram of an electronic device for supporting legacy network communication and 5G network communication, according to various embodiments.

FIG. 2 illustrates a block diagram 200 of the electronic device 101 for supporting legacy network communication and 5G network communication, according to various embodiments. Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The second network 199 may include a first cellular network 292 and a second cellular network 294. According to another embodiment, the electronic device 101 may further include at least one of the components illustrated in FIG. 1, and the second network 199 may include at least one other network. According to an embodiment, the first communication processor 212, the second communication processor 214, the first RFIC 222, the second RFIC 224, the fourth RFIC 228, the first RFFE 232, and the second RFFE 234 may form at least a part of the wireless communication module 192. According to another embodiment, the fourth RFIC 228 may be omitted or may be included as a part of the third RFIC 226.

The first communication processor 212 may establish a communication channel of a band to be used for wireless communication with the first cellular network 292 and may support legacy network communication over the established communication channel. According to various embodiments, the first cellular network 292 may be a legacy network including 2G, 3G, 4G, and/or long term evolution (LTE) network. The second communication processor 214 may support the establishment of a communication channel corresponding to a specified band (e.g., about 6 GHz~about 60 GHz) among bands to be used for wireless communication with the second cellular network 294 and 5G network communication via the established communication channel. According to various embodiments, the second cellular network 294 may be 5G network defined in 3GPP. Additionally, according to an embodiment, the first communication processor 212 or the second communication processor 214 may establish a communication channel for a specified band (e.g., about 6 GHz or lower) of the bands to be used for wireless communication with the second cellular network 294 and may support 5G network communication through the established communication channel. According to an embodiment, the first communication processor 212 and the second communication processor 214 may be implemented within a single chip or a single package. According to various embodiments, the first communication processor 212 or the second communication processor 214 may be implemented in a single chip or a single package together with the processor 120, the auxiliary processor 123 of FIG. 1, or the communication module 190 of FIG. 1.

In the case of transmitting a signal, the first RFIC 222 may convert a baseband signal generated by the first communication processor 212 into a radio frequency (RF) signal of approximately 700 MHz to approximately 3 GHz that is used in the first cellular network 292 (e.g., a legacy network). In the case of receiving a signal, an RF signal may be obtained from the first cellular network 292 (e.g., a legacy network) through an antenna (e.g., the first antenna module 242) and may be pre-processed through an RFFE (e.g., the first RFFE 232). The first RFIC 222 may convert the preprocessed RF signal to a baseband signal so as to be processed by the first communication processor 212.

In the case of transmitting a signal, the second RFIC 224 may convert a baseband signal generated by the first communication processor 212 or the second communication processor 214 into an RF signal (hereinafter referred to as a "5G Sub6 RF signal") in a Sub6 band (e.g., approximately 6 GHz or lower) used in the second cellular network 294 (e.g., a 5G network). In the case of receiving a signal, a 5G Sub6 RF signal may be obtained from the second cellular network 294 (e.g., a 5G network) through an antenna (e.g., the second antenna module 244) and may be pre-processed through an RFFE (e.g., the second RFFE 234). The second RFIC 224 may convert the preprocessed 5G Sub6 RF signal to a baseband signal so as to be processed by a communication processor corresponding to one of the first communication processor 212 or the second communication processor 214.

The third RFIC 226 may convert a baseband signal generated by the second communication processor 214 into an RF signal (hereinafter referred to as a "5G Above6 RF signal") in a 5G Above6 band (e.g., approximately 6 GHz to approximately 60 GHz) to be used in the second cellular network 294 (e.g., a 5G network). In the case of receiving a signal, a 5G Above6 RF signal may be obtained from the second cellular network 294 (e.g., a 5G network) through an antenna (e.g., the antenna 248) and may be pre-processed through a third RFFE 236. For example, the third RFFE 236 may perform pre-processing on a signal by using a phase shifter 238. The third RFIC 226 may convert the preprocessed 5G Above 6 RF signal to a baseband signal so as to be processed by the second communication processor 214. According to an embodiment, the third RFFE 236 may be formed as the part of the third RFIC 226.

According to an embodiment, the electronic device 101 may include the fourth RFIC 228 independently of the third RFIC 226 or as at least a part of the third RFIC 226. In this case, the fourth RFIC 228 may convert a baseband signal generated by the second communication processor 214 into an RF signal (hereinafter referred to as an "IF signal") in an intermediate frequency band (e.g., approximately 9 GHz to approximately 11 GHz) and may provide the IF signal to the third RFIC 226. The third RFIC 226 may convert the IF signal into a 5G Above6 RF signal. At the time of reception, the 5G Above6 RF signal may be received from the second cellular network 294 (e.g., a 5G network) via an antenna (e.g., the antenna 248) and may be converted to the IF signal by the third RFIC 226. The fourth RFIC 228 may convert the IF signal into a baseband signal to be processed by the second communication processor 214.

According to an embodiment, the first RFIC 222 and the second RFIC 224 may be implemented as at least part of a single chip or a single package. According to an embodiment, the first RFFE 232 and the second RFFE 234 may be implemented as at least part of a single chip or a single package. According to an embodiment, at least one antenna module of the first antenna module 242 or the second antenna module 244 may be omitted or may be coupled to another antenna module and then may process RF signals of a plurality of corresponding bands.

According to an embodiment, the third RFIC 226 and the antenna 248 may be disposed on the same substrate to form a third antenna module 246. For example, the wireless communication module 192 or the processor 120 may be disposed on a first substrate (e.g., a main PCB). In this case, the third RFIC 226 may be disposed in a partial region (e.g., a bottom surface) of a second substrate (e.g., sub PCB) separately of the first substrate; the antenna 248 may be disposed in another partial region (e.g., an upper surface), and thus the third antenna module 246 may be formed. According to an embodiment, the antenna 248 may include, for example, an antenna array capable of being used for beamforming. As the third RFIC 226 and the antenna 248 are disposed at the same substrate, it may be possible to decrease a length of a transmission line between the third RFIC 226 and the antenna 248. For example, the decrease in the transmission line may make it possible to prevent a signal in a high-frequency band (e.g., approximately 6 GHz to approximately 60 GHz) used for the 5G network communication from being lost (or attenuated) due to the transmission line. As such, the electronic device 101 may improve the quality or speed of communication with the second cellular network 294 (e.g., a 5G network).

The second cellular network 294 (e.g., a 5G network) may be used independently of the first cellular network 292 (e.g., a legacy network) (e.g., this scheme being called "stand-alone (SA)") or may be used in connection with the first cellular network 292 (e.g., this scheme being called "non-standalone (NSA)"). For example, only an access network (e.g., a 5G radio access network (RAN) or a next generation RAN (NG RAN)) may be present in the 5G network, and a core network (e.g., a next generation core (NGC)) may be absent from the 5G network. In this case, the electronic device 101 may access the access network of the 5G network and may then access an external network (e.g., Internet) under control of a core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 130 so as to be accessed by any other component (e.g., the processor 120, the first communication processor 212, or the second communication processor 214).

Figure 3:
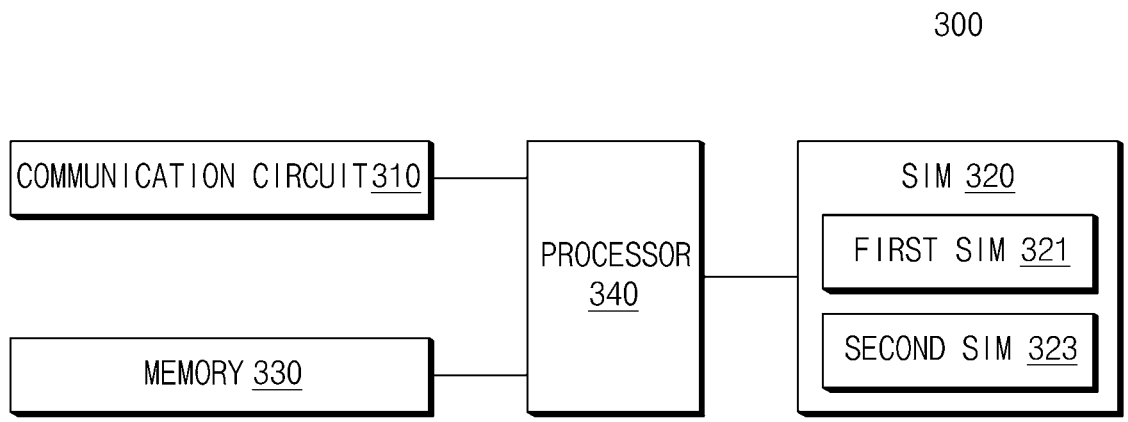
FIG. 3 illustrates a block diagram of an electronic apparatus according to an embodiment.

FIG. 3 illustrates a block diagram of an electronic apparatus according to an embodiment.

According to an embodiment, an electronic device 300 (e.g., the electronic device 101 of FIGS. 1 and 2) may include a communication circuit 310, a SIM, a processor 340, and a memory 330.

According to an embodiment, the communication circuit 310 may communicate with an external electronic device (e.g., the electronic device 102, 104 or server 108 of FIG. 1) or an external network (e.g., the first network 198 (e.g., a 4G network) or the second network 196 (e.g., a 5G network) in FIG. 1), under the control of the processor 340 or independently of the processor 340. According to an embodiment, the communication circuit 310 may include at least part of the communication module 190 illustrated in FIG. 1.

According to an embodiment, the electronic device 300 may include at least two SIMS 320 (a first SIM 321 and a second SIM 323). According to an embodiment, the electronic device 300 may support a dual SIM dual standby (DSDS) mode. According to an embodiment, each of the first SIM 321 and the second SIM 323 may support communication with the 4G network and/or the 5G network. According to an embodiment, the SIM 320 may include various types of SIMs. For example, the type of the SIM 320 may include an embedded-SIM and/or a SIM card removable from the electronic device 300. According to various embodiments, all at least two SIMS (e.g., the first SIM 321 and the second SIM 323) included in the electronic device may be the same type of SIMs, and at least one of the at least two SIMs (e.g., the first SIM 321 and the second SIM 323) may be a different type of SIM.

According to an embodiment, the memory 330 may store instructions executed by the processor 340. According to an embodiment, the memory 330 may at least temporarily store first capability information and second capability information associated with functions supported by the electronic device 300, in connection with the first SIM 321 and the second SIM 323. According to an embodiment, the memory 330 may include at least part of the memory 130 illustrated in FIG. 1.

According to an embodiment, the processor 340 may set the first SIM 321 as a SIM (hereinafter referred to as 'data service SIM') associated with a data service, and may set the second SIM 323 as a SIM (hereinafter referred to as 'non-data service SIM') not associated with data service. For example, the processor 340 may attach the electronic device 300 to at least one of networks associated with the first SIM and the second SIM, using the first SIM and the second SIM. For example, the processor 340 may connect the first SIM set as the data service SIM to Internet (e.g., public data network (PDN)) used for the data service, and may not perform Internet (e.g., PDN) connection using the second SIM set as the non-data service SIM. For example, the processor 340 may connect the first SIM and the second SIM to Internet (e.g., PDN) used for data service, regardless of whether the data service SIM is set, and may connect and use an actual data service with a SIM used for data service of various applications of electronic devices among the first SIM and the second SIM, which is the first SIM set as data service SIM.

According to an embodiment, the processor 340 may determine the first capability information associated with the function supported by the electronic device 300 in connection with the first SIM 321, and the second capability information associated with the function supported by the electronic device 300 in connection with the second SIM 323, which are to be transmitted to a network, based on whether the first SIM 321 or the second SIM 323 is set as a data service SIM or a non-data service SIM. According to an embodiment, with regard to the first SIM 321, the processor 340 may determine the first capability information including carrier aggregation (CA) information and/or E-UTRA NR dual connectivity (ENDC) information to be transmitted to a network (e.g., a 4G network and/or a 5G network). According to an embodiment, with regard to the second SIM 323, the processor 340 may determine the second capability information not including CA information and/or ENDC information. According to an embodiment, with regard to the second SIM 323, the processor 340 may determine the second capability information such that at least part of information associated with the data service among the information associated with a call service and information associated with the data service, which are capable of being supported by the electronic device 300, is not included. For example, when attaching the electronic device 300 to the 4G network (e.g., LTE) in connection with the second SIM 323, the processor 340 may determine the second capability information obtained by deleting or changing at least part (e.g., CA combination) of information associated with a data service among the information defined in 3gpp spec 36.331, and may transmit the determined second capability information to the network. For example, when attaching the electronic device 300 to the 5G network (e.g., new radio (NR)) in connection to the second SIM 323, the processor 340 may determine the second capability information obtained by deleting or changing at least part (e.g., CA-ParametersEUTRA or CA-ParametersNR) of information related to the data service, and may transmit the determined second capability information to the network. According to an embodiment, the information associated with the call service may include information associated with voice or new radio (VOLAR) supported by the 5G network.

According to an embodiment, with regard to the second SIM 323, the processor 340 may determine the second capability information to be transmitted to the network so as to indicate that the electronic device 300 does not support at least part of supportable functions. For example, with regard to the second SIM 323, the processor 340 may determine the second capability information obtained by deleting or changing at least part (e.g., BandCombinationParameters) of information associated with CA band combination, and may transmit the determined second capability information to the network.

According to an embodiment, the processor 340 may determine the first capability information of the first SIM 321 or the second capability information of the second SIM 323, which are to be transmitted to the network, by adjusting (or changing) the configuration of an OTA message (Attach request or Tracking are update request message) used during the registration procedure of the electronic device 300 (or SIM) at a NAS layer depending on whether the data service SIM or non-data service SIM is set. For example, when the second SIM 323 is set to the non-data service SIM, the processor 340 may determine the second capability information to be transmitted to the network, by changing or deleting a value of an item indicating whether DCNR of "Attach Request message" or "Tracking area update request message" and "Dual Connectivity of E-UTRA with NR capability" are supported.

TABLE 1

LTE NAS EMM Plain OTA Outgoing Message -- Attach request Msg
ue_netwk_cap
DCNR = 1 (0x1)
ms_netwk_cap
Dual connectivity of E-UTRA with NR capability = 1 (0x1)
LTE NAS EMM Plain OTA Outgoing Message -- Tracking area update request Msg
ue_netwk_cap
DCNR = 1 (0x1)
ms_netwk_cap
Dual connectivity of E-UTRA with NR capability = 1 (0x1)

For example, in the "attach request message" or the "tracking area update request message" shown in Table 1, the processor 340 may change the values of the items (DCNR and "Dual connectivity of E-UTRA with NR capability") indicating the capability for the network of SIM, from "1" indicating that the corresponding function is supported, to "0" indicating that the corresponding function is not supported.

According to another embodiment, when receiving a request for information associated with the capability of the electronic device 300 from the network, the processor 340 may determine the first capability information about the first SIM 321 or the second capability information about the second SIM 323, which are to be transmitted to the network, in the AS layer depending on whether the data service SIM or non-data service SIM is set.

TABLE 2

UECapabilityEnquiry// DL_DCCH - Example
of parameters of capability request
of electronic device 300 from network
value DL-DCCH-Message ::=
message c1 : ueCapabilityEnquiry :
rrc-TransactionIdentifier 1,
criticalExtensions c1 : ueCapabilityEnquiry-r8 :
{
ue-CapabilityRequest
{
eutra,
UECapabilityInformation// UL_DCCH - Example
of CA-related information parameters
among responses to request of network
rf-Parameters-v1020
{
supportedBandCombination-r10
{
{
{
bandEUTRA-r10 4,
bandParametersUL-r10
{
{
ca-BandwidthClassUL-r10 a
}
},
bandParametersDL-r10
{
{
ca-BandwidthClassDL-r10 a,
supportedMIMO-CapabilityDL-r10 fourLayers For example, as shown in the Table 2, when receiving a message for requesting the capability of the electronic device 300 from the network, the processor 340 may transmit capability information (e.g., UECapabilityInformation) in response to the message. For example, with regard to the second SIM 323, the electronic device 300 may delete or change at least part of capability information about the second SIM 323 for attaching the electronic device 300 to the network, in response to a request from the network. For example, with regard to the second SIM 323, the capability information about the second SIM 323 for attaching the electronic device 300 to the network may include various parameters other than the parameters for CA support shown in Table 2. For example, with regard to the second SIM 323 set as a non-data service SIM, the electronic device 300 may determine capability information changed to indicate that items (e.g., examples of CA-related information parameters in responses to the request of a network in Table 2) indicating CA support information (or ENDC support information in the case of a 5G network) shown in Table 2 is deleted or to indicate that CA (or ENDC) is not supported, and then may transmit the determined capability information to the network.

According to an embodiment, the processor 340 may transmit the determined first capability information and second capability information to the network through the communication circuit 310. For example, as the registration procedure for attaching the electronic device 300 to the network in connection with the first SIM 321 and the second SIM 323, the processor 340 may transmit an attach request for attaching the electronic device 300 to the network in connection with the first SIM 321 and the second SIM 323. For example, the processor 340 may receive an inquiry about a function supported by the electronic device 300 in connection with each of the first SIM 321 and the second SIM 323 from a network, in response to the attach request. For example, the processor 340 may transmit the determined first capability information and second capability information to the network, in response to the inquiry of a network.

According to an embodiment, the processor 340 may receive the allocation of a resource for wireless communication corresponding to each of the first SIM 321 and the second SIM 323 from a network through the communication circuit 310, based on the first capability information and the second capability information. According to an embodiment, because the processor 340 determines the first capability information to indicate that the electronic device 300 supports CA or ENDC, in connection with the first SIM 321, and determines the second capability information to indicate that the electronic device 300 does not support CA or ENDC, in connection with the second SIM 323, the processor 340 may receive the allocation of resources for CA or ENDC for wireless communication corresponding to the first SIM 321 from a network, and may not receive the allocation of resources for CA or ENDC for wireless communication corresponding to the second SIM 323.

According to an embodiment, the processor 340 may receive an input to change a data service SIM among the first SIM 321 and the second SIM 323, through an input device (e.g., the input device 150 of FIG. 1). According to an embodiment, the processor 340 may determine the first capability information about the first SIM 321 and the second capability information about the second SIM 323, which are to be transmitted to the network, in response to the received input based on whether the changed data service SIM or non-data service SIM is set. For example, whenever the setting of the data service SIM or non-data service SIM is changed, the processor 340 may determine the first capability information about the first SIM 321 and the second capability information about the second SIM 323. According to an embodiment, the processor 340 may transmit the first capability information and the second capability information, which are determined based on whether the changed data service SIM is set, to the network. According to an embodiment, the processor 340 may receive the allocation of resources for wireless communication corresponding to each of the first SIM 321 and the second SIM 323 from a network based on the first capability information and the second capability information that are determined based on whether the changed data service SIM is set.

According to an embodiment, the processor 340 may include at least part of the processor 120 and/or the wireless communication module 192 illustrated in FIG. 1.

The electronic device according to an embodiment may transmit the capability information set as if the function (e.g., CA and/or ENDC) supported by the SIM is not supported for the SIM (e.g., the second SIM) set as a non-data service SIM, or may not transmit the capability information, thereby preventing unnecessary resource from being allocated from the network for the SIM set as a non-data service SIM, and preventing unnecessary power consumption or functional degradation in electronic devices according thereto.

Figure 4A:
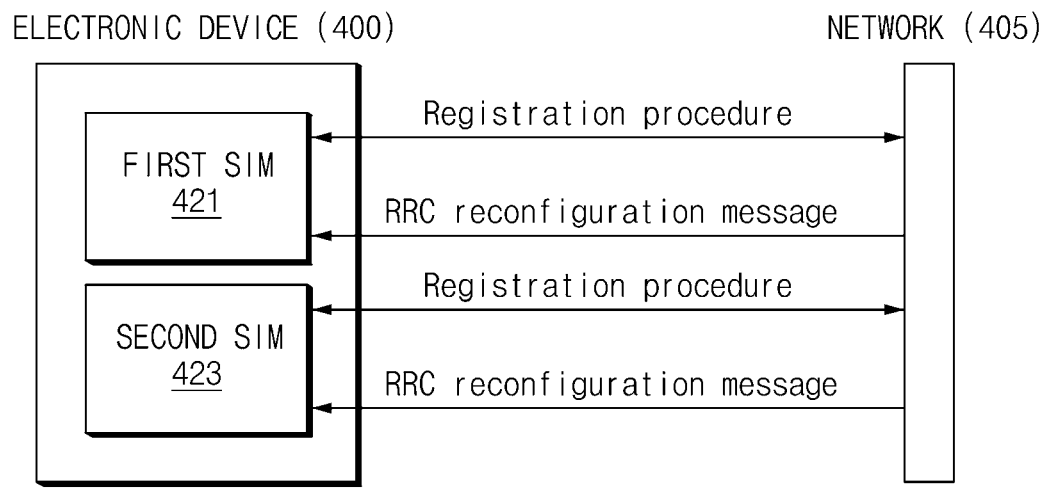
FIGS. 4A and 4B illustrates diagrams of an operation of attaching a SIM of an electronic device to a network according to an embodiment.
Figure 4B:
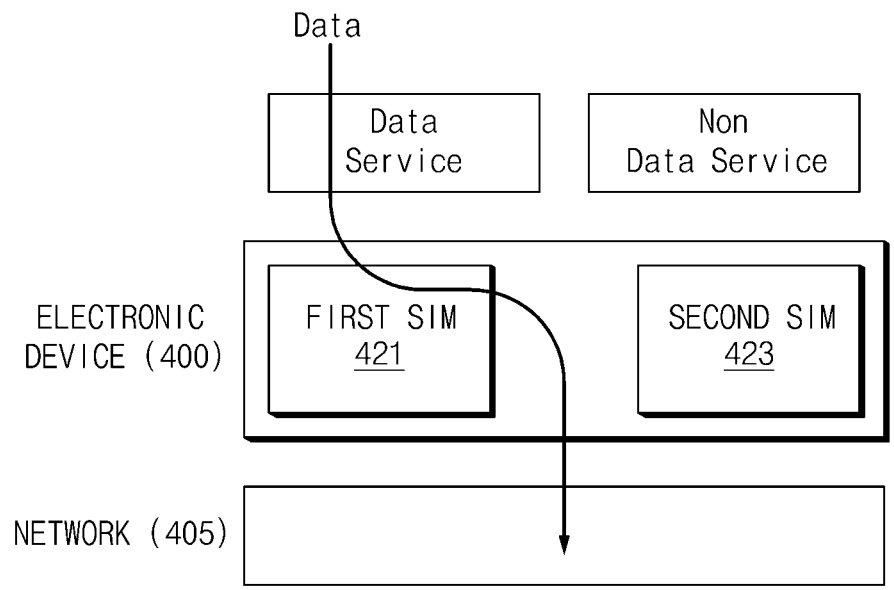

FIGS. 4A and 4B illustrate diagrams of an operation of attaching a SIM of an electronic device 400 to a network 405 according to an embodiment.

According to an embodiment, the electronic device 400 (e.g., the electronic device 101 of FIGS. 1 and 2, or the electronic device 300 of FIG. 3) may attach the electronic device 400 to at least one network 405 associated with a first SIM 421 and a second SIM 423 using the first SIM 421 and the second SIM 423. According to an embodiment, the network 405 may include at least one of a plurality of networks (e.g., a 4G network, a 5G network, and/or networks of a plurality of operators). For example, the electronic device 400 may perform a registration procedure for attaching the electronic device 400 to the network 405, using each of the first SIM 421 and the second SIM 423. For example, the electronic device 400 may transmit information (e.g., capability information) associated with the function supported by the electronic device 400 to the network 405 through an attach request, a tracking area update request, or UEcapablitiyinformation. According to an embodiment, the information associated with the function supported by the electronic device 400 may include carrier aggregation (CA) information or E-UTRA NR dual connectivity (ENDC) information.

According to an embodiment, the network 405 may transmit an RRC reconfiguration message to the electronic device 400 to complete the attachment of the electronic device 400, in response to the registration procedure of the electronic device 400 (e.g., the first SIM 421 and the second SIM 423). For example, the network may allocate communication resources necessary to use services to each of the first SIM 421 and the second SIM 423 of the electronic device 400 through the RRC reconfiguration message. According to an embodiment, the communication resource may include a resource for CA or a resource for ENDC. According to an embodiment, the RRC reconfiguration message may include an RRCConnection Reconfiguration message defined in $3^{rd}$ generation partnership project (3GPP) specification TS36.331 or an RRCReconfiguration message defined in TS38.331.

Referring to FIG. 4B, the electronic device 400 may set at least one of a plurality of SIMs as a SIM (hereinafter, referred to as "data service SIM") associated with a data service. According to an embodiment, the first SIM and the second SIM of the electronic device 400 may operate in a dual SIM dual standby (DSDS) mode. For example, in the case of the electronic device 400 supporting dual SIM dual standby (DSDS), data communication may be supported through the only SIM set as a data service SIM. According to an embodiment, the electronic device 400 may set at least one of a plurality of SIMs as a data service SIM depending on the input of a user, and may set a previously-specified SIM as a data service SIM in a specific situation (e.g., when the electronic device 400 is booted). For example, the electronic device 400 may set the first SIM 421 as a data service SIM, and may set the second SIM 423 as a SIM irrelevant to the data service (hereinafter, referred to as 'non-data service SIM'). According to an embodiment, when the electronic device 400 sets a specific SIM (e.g., the first SIM 421) as a data service SIM, a function (e.g., capability) capable of being supported by the electronic device 400 may be changed in connection with the first SIM 421 and the second SIM 423. According to an embodiment, when the electronic device 400 is set to a specific SIM (e.g., the first SIM 421) as a data service SIM (or, non-data service SIM), as illustrated in FIG. 4A, the electronic device 400 may perform a registration procedure for attaching the electronic device 400 to the network 405, using the first SIM 421 and the second SIM 423.

According to an embodiment, the electronic device 400 may change the data service SIM. For example, the electronic device 400 may change the data service SIM depending on a user input. For example, the electronic device 400 may set the second SIM 423 as a data service SIM and may set the first SIM 421 as a non-data service SIM.

According to an embodiment, when there is a change in the settings of the data service SIM, the functions (e.g., capability) capable of being supported by the electronic device 400 may be changed with regard to the second SIM 423 set as the data service SIM of the electronic device 400 and the first SIM 421 set as non-data service SIM. According to an embodiment, when the settings of the data service SIM are changed, as illustrated in FIG. 4A, the electronic device 400 may re-perform a registration procedure for attaching the electronic device 400 to the network 405, using the first SIM 421 and the second SIM 423.

Figure 5A:
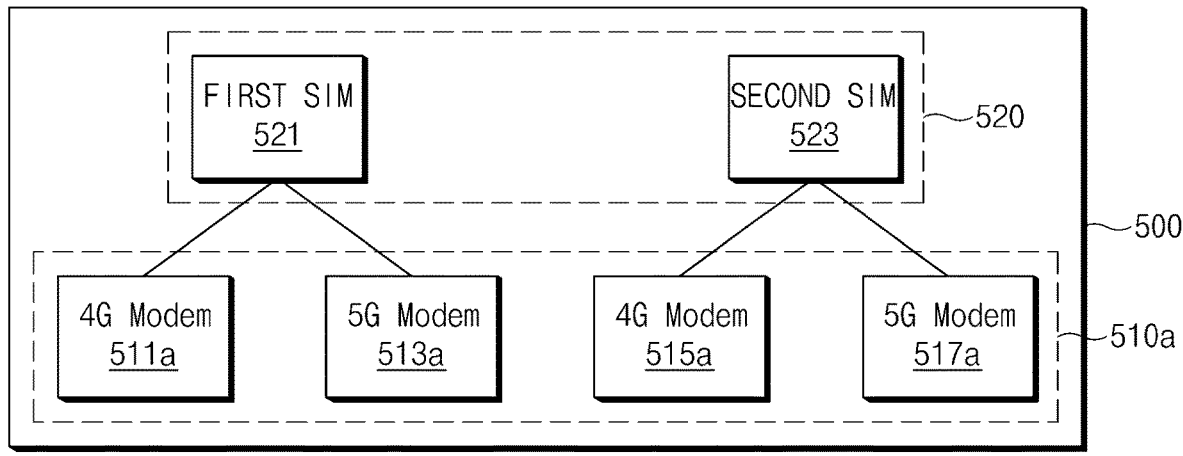
FIGS. 5A and 5B illustrates diagrams of configurations of a communication circuit of an electronic device according to various embodiments.
Figure 5B:
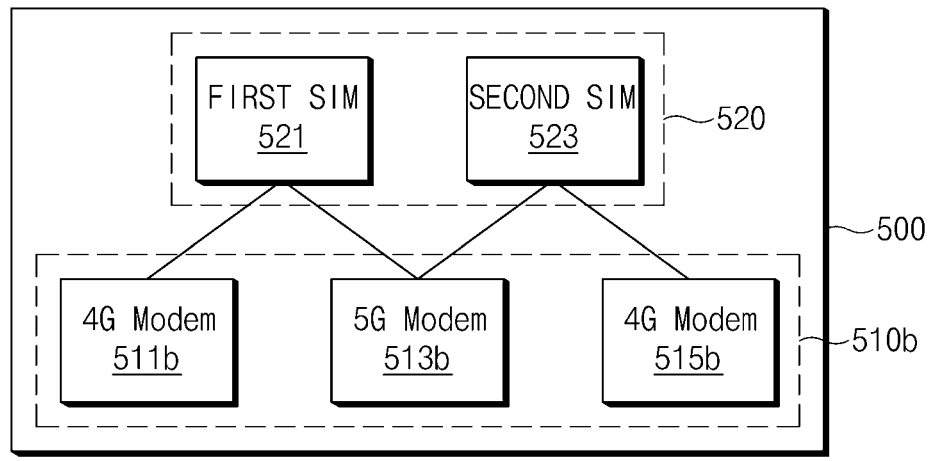

FIGS. 5A and 5B illustrates diagrams of configurations of a communication circuit of an electronic device according to various embodiments.

According to an embodiment, an electronic device 500 may include at least two SIMS 520 (a first SIM 521 and a second SIM 523), and a communication circuit 510a. According to an embodiment, referring to FIG. 5A, the communication circuit 510a may include a first 4G modem 511a communicating with a 4G network using the first SIM 521, a first 5G modem 513a communicating with a 5G network using the first SIM 521, a second 4G modem 515a communicating with the 4G network using the second SIM 523, and a second 5G modem 517a communicating with a 5G network using the second SIM 523. According to an embodiment, the first 4G modem 511a, the first 5G modem 513a, the second 4G modem 515a, and the second 5G modem 517a included in the communication circuit 510a may be implemented with independent modules separate from each other, and at least one thereof may be implemented with an integrated module.

Referring to FIG. 5B, at least part of a communication circuit 510b may be used for the first SIM 521 and the second SIM 523 commonly. For example, unlike the communication circuit 510a of FIG. 5A, the communication circuit 510b of FIG. 5B may include a third 4G modem 511b communicating with the 4G network using the first SIM 521, a fourth 4G modem 515b communicating with the 4G network using the second SIM 523, and a third 5G modem 513b communicating with the 5G network using the first SIM 521 or the second SIM 523.

According to various embodiments, the configuration of the communication circuit 510a or 510b is not limited to those illustrated in FIGS. 5A and 5B. Various configurations may be provided to connect to at least one network using the first SIM 521 and the second SIM 523.

Figure 6:
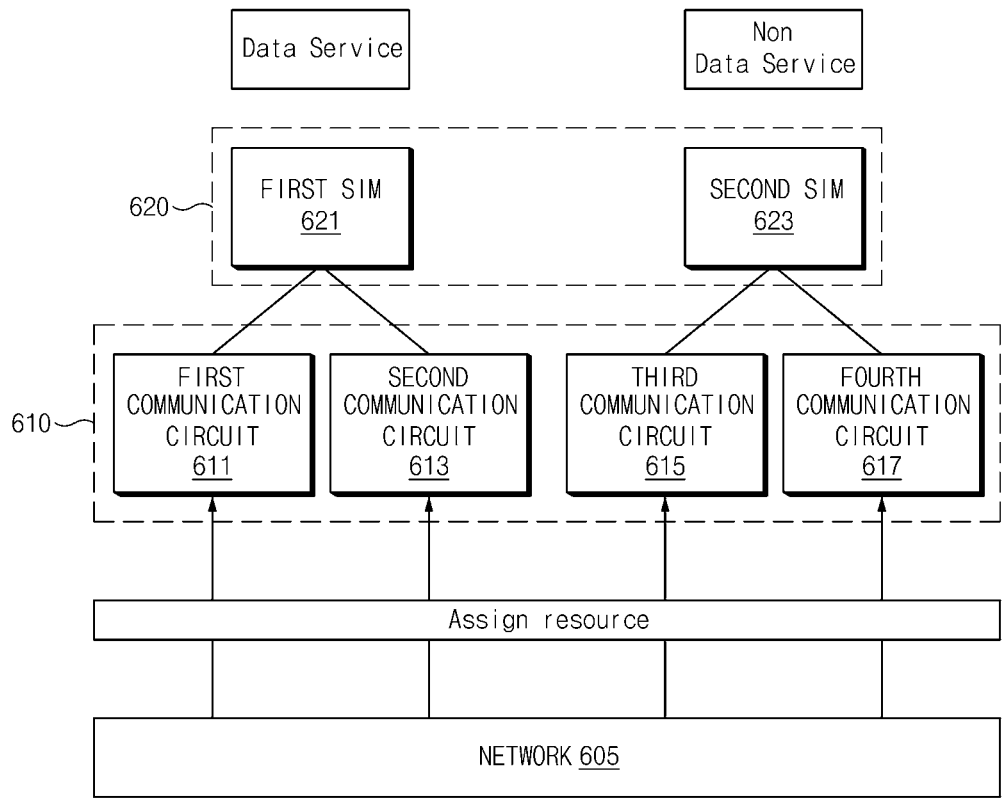
FIG. 6 illustrates a diagram of an operation of an electronic device according to an embodiment.

FIG. 6 illustrates a diagram of an operation of an electronic device according to an embodiment.

According to an embodiment, an electronic device may include a first SIM 621, a second SIM 623 and a communication circuit 610. According to an embodiment, the electronic device may set the first SIM 621 as a data service SIM and may set the second SIM 623 as a non-data service SIM.

According to an embodiment, the communication circuit 610 may include a first communication circuit 611 supporting 4G network communication for the first SIM 621, a second communication circuit 613 supporting 5G network communication for the first SIM 621, a third communication circuit 615 supporting 4G network communication for the second SIM 623, and a fourth communication circuit 617 supporting 5G network communication for the second SIM 623. For example, the first communication circuit 611 and the third communication circuit 615 that support a 4G network may support CA. For example, the second communication circuit 613 and the fourth communication circuit 617 that support a 5G network may support ENDC. According to an embodiment, in FIG. 6, it is illustrated that the communication circuits 611 and 615 supporting 4G network communication respectively connected to the first SIM 621 and the second SIM 623 and the communication circuits 613 and 617 supporting 5G network communication respectively connected to the first SIM 621 and the second SIM 623 are independent configurations, but are not limited thereto. The electronic device may include a communication circuit 610 in the form of sharing at least part of a communication circuit supporting 4G network communication and/or a communication circuit supporting 5G network communication for the first SIM 621 and the second SIM 623.

According to an embodiment, the electronic device may determine first capability information associated with the function supported by the electronic device 600 in connection with the first SIM 621, and second capability information associated with the function supported by the electronic device 600 in connection with the second SIM 623, which are to be transmitted to a network 605, based on whether the data service SIM is set, and may transmit the first and second capability information to the network 605 through the communication circuit 610.

According to an embodiment, the electronic device may allocate the first resource corresponding to the first capability information to the wireless communication corresponding to the first SIM 621, and may allocate a second resource corresponding to the second capability information to the wireless communication corresponding to the second SIM 623, from the network 605 through the communication circuit 610. For example, the first resource may include a resource associated with CA or ENDC, and the second resource may not include the CA or ENDC resource. For example, the second resource may not include a resource associated with the data service among a resource associated with a call service and a resource associated with a data service.

Figure 7:
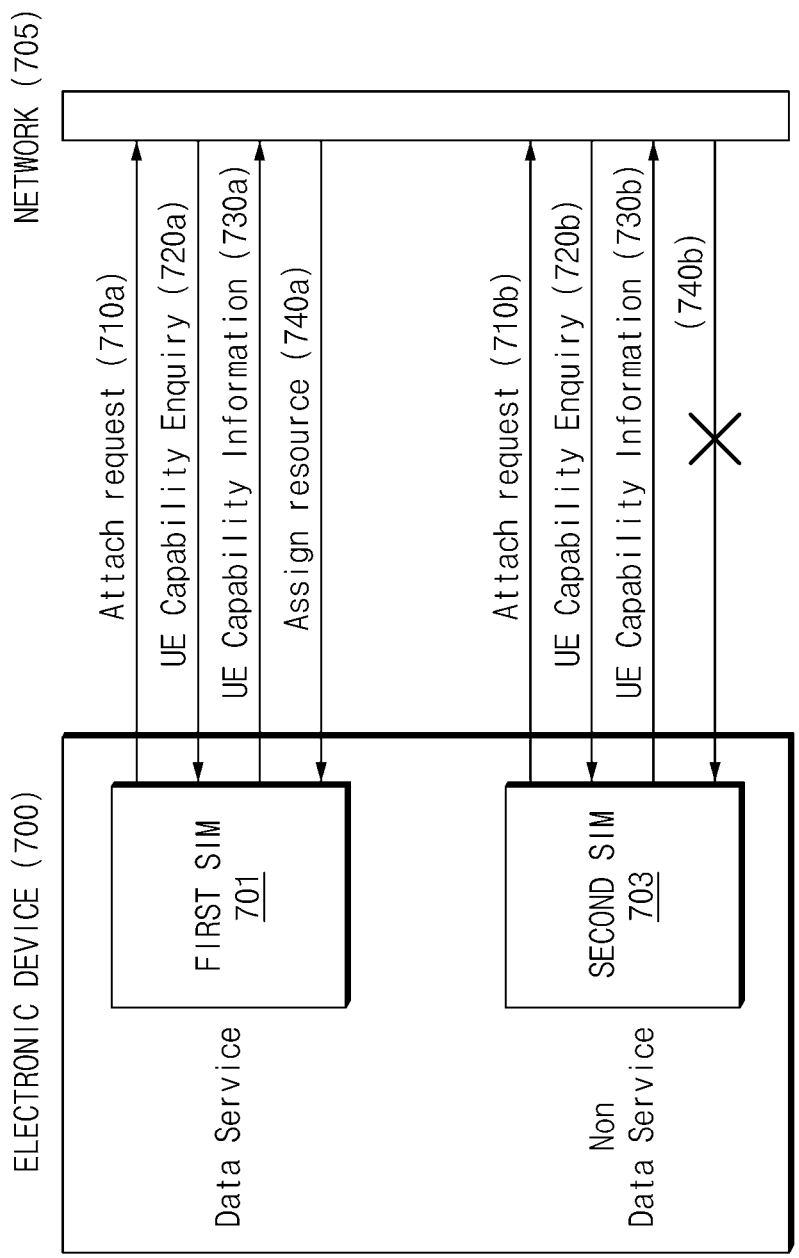
FIG. 7 illustrates a diagram of an operation of an electronic device according to an embodiment.

FIG. 7 illustrates a diagram of an operation of an electronic device (e.g., the electronic device 101 of FIGS. 1 and 2, or the electronic device 300 of FIG. 3) according to an embodiment.

According to an embodiment, an electronic device 700 may include a first SIM 701 and a second SIM 703. According to an embodiment, the electronic device 700 may set the first SIM 701 as a data service SIM and may set the second SIM 703 as a non-data service SIM. According to an embodiment, the electronic device 700 may receive the allocation of resources for wireless communication corresponding to each of the first SIM 701 and the second SIM 703 from a network 705 through the registration procedure for attaching the electronic device 700 to the network 705 by using the first SIM 701 and the second SIM 703. According to an embodiment, the electronic device 700 may perform the registration procedures 710a to 740a and 710b to 740b for attaching the electronic device 700 to the network 705, using the first SIM 701 and the second SIM 703.

According to an embodiment, in operation 710a, the electronic device 700 may transmit an attach request to the network 705 for attaching the electronic device 700 to the network 705, using the first SIM 701. According to an embodiment, in operation 720a, the network 705 may transmit a request (e.g., UE Capability Enquiry) for information about the function capable of being supported by the electronic device 700 (e.g., the first SIM 701), to the electronic device 700 in response to the attach request. According to an embodiment, in operation 730a, the electronic device 700 may transmit first capability information (e.g., UE Capability Information) of the electronic device 700 associated with the first SIM 701 to the network 705 in response to the request of the network 705. For example, the first capability information may indicate that the electronic device 700 supports CA or ENDC in connection with the first SIM 701. According to an embodiment, in operation 740a, the network 705 may allocate a resource for wireless communication corresponding to the first SIM 701 corresponding to the first capability information, to the electronic device 700. For example, the network 705 may allocate a resource for wireless communication corresponding to the first SIM 701 to the electronic device 700 through an RRC Reconfiguration message. For example, the network 705 may allocate a resource corresponding to the first capability information to wireless communication corresponding to the first SIM 701.

According to an embodiment, in operation 710b, the electronic device 700 may transmit an attach request to the network 705 for attaching the electronic device 700 to the network 705, using the second SIM 703. According to an embodiment, in operation 720b, the network 705 may transmit a request (e.g., UE Capability Enquiry) for information about the function capable of being supported by the electronic device 700 (e.g., the second SIM 703), to the electronic device 700 in response to the attach request. According to an embodiment, in operation 730b, the electronic device 700 may transmit second capability information (e.g., UE Capability Information) of the electronic device 700 associated with the second SIM 703 to the network 705 in response to the request of the network 705. For example, the second capability information may indicate that the electronic device 700 does not support CA or ENDC in connection with the second SIM 703. For example, even though the electronic device 700 may support CA or ENDC using the second SIM 703, the electronic device 700 may transmit second capability information indicated as if the CA or ENDC is not supported in connection with the second SIM 703 set as a non-data service SIM, to the network 705. For example, even though the electronic device 700 may support the same function using the first SIM 701 and the second SIM 703, as if the electronic device 700 has different capabilities in connection with the first SIM 701 and the second SIM 703 based on whether to set a data service SIM or non-data service SIM, the electronic device 700 may determine the first capability information and the second capability information, and may transmit the determined first capability information and the determined second capability information to the network 705. According to an embodiment, in operation 740b, the network 705 may allocate a resource for wireless communication corresponding to the second SIM 703 corresponding to the second capability information. For example, the network 705 may allocate a resource for wireless communication corresponding to the second SIM 703 to the electronic device 700 through an RRC Reconfiguration message. For example, the network 705 may allocate a resource corresponding to the second capability information to wireless communication corresponding to the second SIM 703. According to an embodiment, the network 705 may not allocate resources for CA or ENDC to wireless communication corresponding to the electronic device 700 and/or the second SIM 703 based on the second capability information. For example, while transmitting an RRC configuration message to the electronic device 700, the network 705 may not allocate resources for CA or ENDC to wireless communication corresponding to the second SIM 703. For example, the RRC configuration message may not include information for allocating resources for CA or ENDC to wireless communication corresponding to the second SIM 703 among the resources for the second SIM 703.

According to an embodiment of the disclosure, an electronic device may include a first subscriber identity module (SIM), a second SIM, a communication circuit, a memory, and a processor operatively connected to the first SIM, the second SIM, the communication circuit, and the memory.

According to an embodiment, the memory may store instructions that, when executed, cause the processor to set the first SIM to a SIM associated with a data service, and set the second SIM to a SIM irrelevant to the data service, to determine first capability information associated with a function supported by the electronic device in connection with the first SIM, and second capability information associated with a function supported by the electronic device in connection with the second SIM, which are to be transmitted to a network, based on whether the first SIM or the second SIM is set as the SIM associated with the data service, to transmit the first capability information and the second capability information to the network through the communication circuit, and to receive allocation of a resource for wireless communication corresponding to each of the first SIM and the second SIM from the network through the communication circuit based on the first capability information and the second capability information.

According to an embodiment, the first capability information may include carrier aggregation (CA) information to be transmitted to a 4G network, or E-UTRA NR dual connectivity (ENDC) information to be transmitted to a 5G network.

According to an embodiment, the second capability information does not include the CA information or the ENDC information.

According to an embodiment, the instructions may, when executed, cause the processor to determine the second capability information to be transmitted to the network so as to indicate that the electronic device does not support at least part of a supportable function, in connection with the second SIM.

According to an embodiment, the instructions may, when executed, cause the processor to determine the second capability information to be transmitted to the network such that at least part of information associated with the data service among information associated with a call service and information associated with the data service, which are capable of being supported by the electronic device, is not included in connection with the second SIM.

According to an embodiment, the information associated with the call service includes information associated with voice or new radio (VOLAR) supported in a 5G network.

According to an embodiment, the instructions may, when executed, cause the processor to receive allocation of a resource for CA or ENDC with respect to wireless communication corresponding to the first SIM from the network and not to receive the allocation of the resource for the CA or ENDC with respect to wireless communication corresponding to the second SIM from the network.

According to an embodiment, the instructions may, when executed, cause the processor to transmit an attach request for attaching the electronic device to the network, using each of the first SIM and the second SIM to the network, to receive an inquiry for a function supported by the electronic device in connection with each of the first SIM and the second SIM from the network in response to the attach request, and to transmit the first capability information and the second capability information to the network in response to the inquiry.

According to an embodiment, the instructions may, when executed, cause the processor to receive an input to change a SIM associated with the data service among the first SIM and the second SIM, to determine the first capability information and the second capability information, which are to be transmitted to the network, based on a setting of a SIM associated with a changed data service in response to the input, and to transmit the first capability information and the second capability information, which are determined based on the setting of the SIM associated with the changed data service, to the network.

According to an embodiment, the first SIM and the second SIM operate in a dual SIM dual standby (DSDS) mode.

Figure 8:
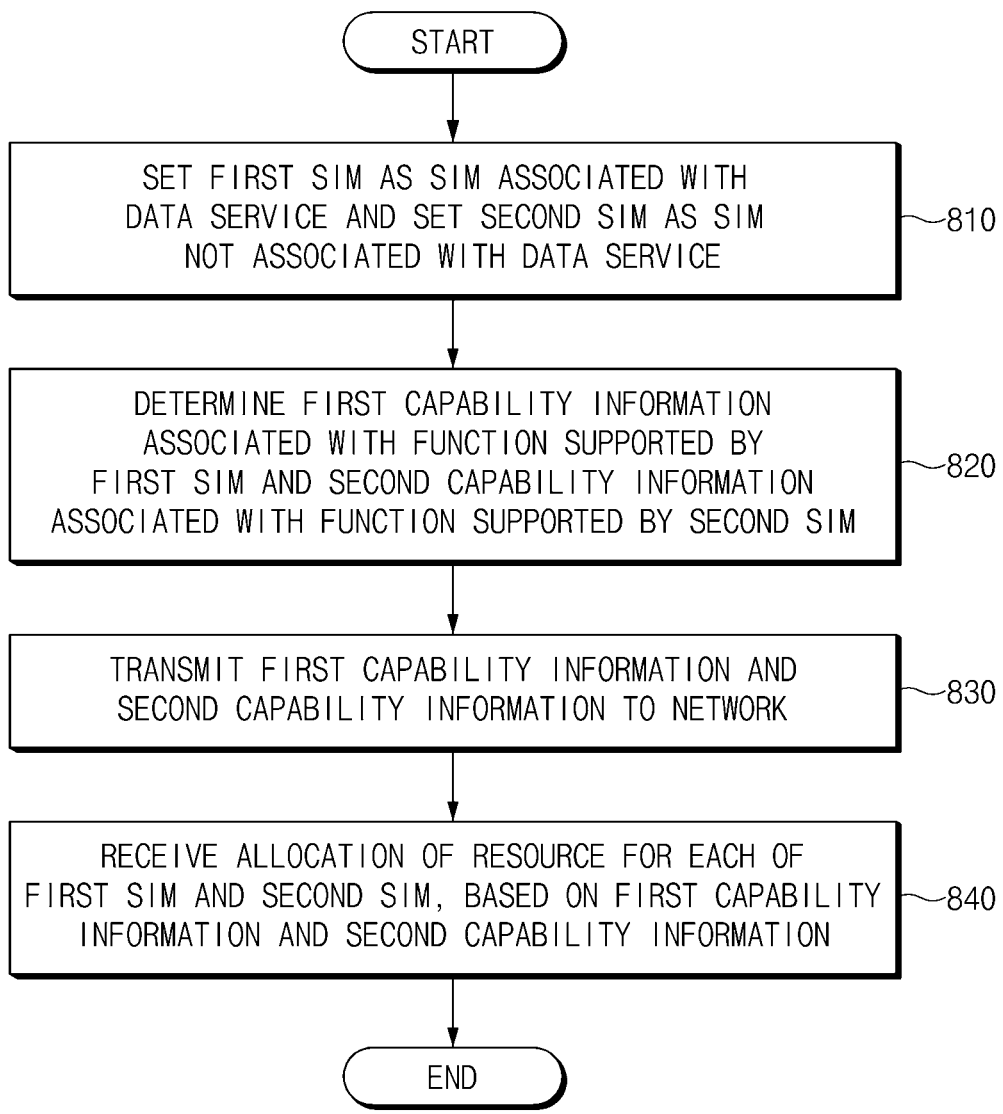
FIG. 8 illustrates a flowchart of an operating method of an electronic device according to an embodiment.

FIG. 8 illustrates a flowchart of an operating method of an electronic device according to an embodiment.

Figure 4B:
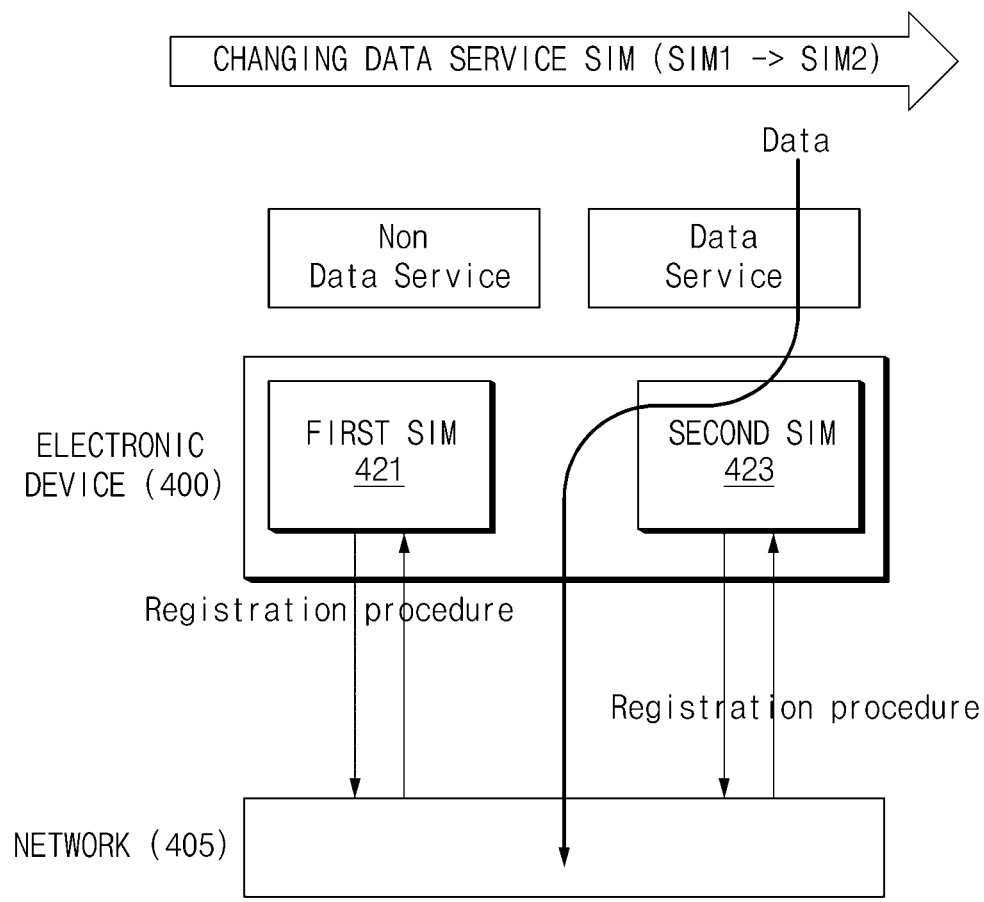

According to an embodiment, in operation 810, an electronic device (e.g., the electronic device 101 of FIGS. 1 and 2 (e.g., the processor 120 of FIGS. 1 and 2, the wireless communication module 192 (e.g., the first communication processor 212 or the second communication processor 214)), the electronic device 300 of FIG. 3, the electronic device 400 of FIG. 4, or the electronic device 700 of FIG. 7) may set a first SIM as a SIM (hereinafter, 'data service SIM') associated with a data service, and may set a second SIM as a SIM (hereinafter, 'non-data service SIM') not associated with the data service.

According to an embodiment, in operation 820, the electronic device may determine first capability information associated with a function supported by the electronic device using the first SIM, and second capability information associated with a function supported by the electronic device 700 using the second SIM. According to an embodiment, with regard to the first SIM, the electronic device may determine the first capability information including CA information and/or ENDC information to be transmitted to a network (e.g., a 4G network and/or a 5G network). According to an embodiment, with regard to the second SIM, the electronic device may determine the second capability information not including CA information and/or ENDC information. According to an embodiment, with regard to the second SIM, the electronic device may determine the second capability information such that at least part of information associated with the data service among the information associated with a call service and information associated with the data service, which are capable of being supported by the electronic device, is not included.

According to an embodiment, with regard to the second SIM, the electronic device may determine the second capability information to be transmitted to the network so as to indicate that the electronic device does not support at least part of supportable functions.

According to an embodiment, in operation 830, the electronic device may transmit the determined first capability information and the determined second capability information to a network. For example, as a registration procedure for attaching an electronic device to the network, using the first SIM and the second SIM, the electronic device may transmit, to the network, an attach request for attaching the electronic device to the network, using each of the first SIM and the second SIM. For example, the electronic device may receive an inquiry about the function supported by the electronic device from a network, in response to the attach request. For example, the electronic device may transmit the determined first capability information and the determined second capability information to the network, in response to the inquiry of a network.

According to an embodiment, in operation 840, the electronic device may receive the allocation of resources for wireless communication corresponding to each of the first SIM and the second SIM, based on the first capability information and the second capability information. According to an embodiment, the electronic device may receive the allocation of resources for CA and/or ENDC for wireless communication corresponding to the first SIM from the network, and may not receive the allocation of resources for CA and/or ENDC for wireless communication corresponding to the second SIM from the network.

In accordance with an operating method of an electronic device according to an embodiment, it is possible to prevent unnecessary resources from being allocated from the network with respect to wireless communication corresponding to the SIM set to a non-data slot, by transmitting capability information set as if at least part of the functions supported by the electronic device is not supported, to the network, or by not transmitting at least part of the capability information to the network, with respect to a SIM set as a non-data service SIM.

According to an embodiment of the disclosure, an operating method of an electronic device including a first SIM and a second SIM may include setting the first SIM to a SIM associated with a data service, and setting the second SIM to a SIM irrelevant to the data service, determining first capability information associated with a function supported by the electronic device in connection with the first SIM, and second capability information associated with a function supported by the electronic device in connection with the second SIM, which are to be transmitted to a network, based on whether the first SIM or the second SIM is set as the SIM associated with the data service, transmitting the first capability information and second capability information to the network through a communication circuit, and receiving allocation of a resource for wireless communication corresponding to each of the first SIM and the second SIM from the network through the communication circuit based on the first capability information and the second capability information.

According to an embodiment, the first capability information may include carrier aggregation (CA) information to be transmitted to a 4G network, or E-UTRA NR dual connectivity (ENDC) information to be transmitted to a 5G network.

According to an embodiment, the second capability information does not include the CA information or the ENDC information.

According to an embodiment, the method may further include determining the second capability information to be transmitted to the network so as to indicate that the electronic device does not support at least part of a supportable function, in connection with the second SIM.

According to an embodiment, the method may further include determining the second capability information to be transmitted to the network such that at least part of information associated with the data service among information associated with a call service and information associated with the data service, which are capable of being supported by the electronic device, is not included in connection with the second SIM.

According to an embodiment, the information associated with the call service includes information associated with voice or new radio (VOLAR) supported in a 5G network.

According to an embodiment, the method may further include receiving allocation of a resource for CA or ENDC with respect to wireless communication corresponding to the first SIM from the network and not receiving the allocation of the resource for the CA or ENDC with respect to wireless communication corresponding to the second SIM from the network.

According to an embodiment, the method may further include transmitting an attach request for attaching the electronic device to the network, using each of the first SIM and the second SIM to the network, receiving an inquiry for a function supported by the electronic device in connection with each of the first SIM and the second SIM from the network in response to the attach request, and transmitting the first capability information and the second capability information to the network in response to the inquiry.

According to an embodiment, the method may further include receiving an input to change a SIM associated with the data service among the first SIM and the second SIM, determining the first capability information and the second capability information, which are to be transmitted to the network, based on a setting of a SIM associated with a changed data service in response to the input, and transmitting the first capability information and the second capability information, which are determined based on the setting of the SIM associated with the changed data service, to the network.

According to an embodiment, the first SIM and the second SIM operate in a dual SIM dual standby (DSDS) mode.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory storage medium" means a tangible device, and does not include a signal (e.g., an electromagnetic wave), but this term does not differentiate between where data is semi-permanently stored in the storage medium and where the data is temporarily stored in the storage medium. For example, "the non-transitory storage medium" may include a buffer where data is temporally stored.

According to an embodiment, a method according to various embodiments of the disclosure may be included and provided in a computer program product. The computer program product may be traded as a product between a seller and a buyer. The computer program product (e.g., downloadable app)) may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to embodiments disclosed in this specification, the performance of an electronic device may be improved by preventing unnecessary resources from being allocated from the network to the electronic device, by not transmitting unnecessary capability information of the electronic device to a network.

Besides, a variety of effects directly or indirectly understood through the specification may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a first subscriber identity module (SIM);
   a second SIM;
   a communication circuit;
   a memory; and
   a processor operatively connected to the first SIM, the second SIM, the communication circuit, and the memory,
   wherein the memory stores instructions that when executed, cause the processor to:
      set the first SIM to a SIM associated with a data service, and set the second SIM to a SIM that is not associated with the data service;
      determine first capability information associated with a function supported by the electronic device in connection with the first SIM, and second capability information associated with a function supported by the electronic device in connection with the second SIM, based on whether the first SIM or the second SIM is set as the SIM associated with the data service, wherein the second capability information indicates that the electronic device does not support at least part of a supportable function, in connection with the second SIM;
      transmit the first capability information and the second capability information to a network through the communication circuit; and
      receive allocation of a resource for wireless communication corresponding to each of the first SIM and the second SIM from the network through the communication circuit, based on the first capability information and the second capability information.

2. The electronic device of claim 1, wherein the first capability information includes carrier aggregation (CA) information for transmission to a 4G network, or E-UTRA NR dual connectivity (ENDC) information to be transmitted to a 5G network.

3. The electronic device of claim 2, wherein the second capability information does not include the CA information or the ENDC information.

4. The electronic device of claim 3, wherein the instructions, when executed, further cause the processor to:
   receive allocation of a resource for carrier aggregation (CA) or E-UTRA NR dual connectivity (ENDC) with respect to wireless communication corresponding to the first SIM from the network; and
   not receive the allocation of the resource for the CA or ENDC with respect to wireless communication corresponding to the second SIM from the network.

5. The electronic device of claim 1, wherein the instructions, when executed, further cause the processor to:
   determine the second capability information to be transmitted to the network, wherein at least part of information associated with the data service among information associated with a call service and information associated with the data service, that are capable of being supported by the electronic device, is not included in connection with the second SIM.

6. The electronic device of claim 5, wherein the information associated with the call service includes information associated with voice or new radio (VOLAR) supported in a 5G network.

7. The electronic device of claim 1, wherein the instructions, when executed, cause the processor to:
   transmit an attach request for attaching the electronic device to the network, using each of the first SIM and the second SIM;
   receive an inquiry for a function supported by the electronic device in connection with each of the first SIM and the second SIM from the network in response to the attach request; and
   transmit the first capability information and the second capability information to the network in response to the inquiry.

8. The electronic device of claim 1, wherein the instructions, when executed, further cause the processor to:
   receive an input to change a SIM associated with the data service among the first SIM and the second SIM;
   determine the first capability information and the second capability information, based on a setting of a SIM associated with a changed data service in response to the input; and
   transmit the first capability information and the second capability information to the network.

9. The electronic device of claim 1, wherein the first SIM and the second SIM operate in a dual SIM dual standby (DSDS) mode.

10. An operating method of an electronic device including a first SIM and a second SIM, the method comprising:
    setting the first SIM to a SIM associated with a data service, and setting the second SIM to a SIM that is not associated with the data service;
    determining first capability information associated with a function supported by the electronic device in connection with the first SIM, and second capability information associated with a function supported by the electronic device in connection with the second SIM, based on whether the first SIM or the second SIM is set as the SIM associated with the data service, wherein the second capability information indicates that the electronic device does not support at least part of a supportable function, in connection with the second SIM;
    transmitting the first capability information and second capability information to a network through a communication circuit; and
    receiving allocation of a resource for wireless communication corresponding to each of the first SIM and the second SIM from the network through the communication circuit, based on the first capability information and the second capability information.

11. The method of claim 10, wherein the first capability information includes CA information to be transmitted to a 4G network, or ENDC information to be transmitted to a 5G network.

12. The method of claim 11, wherein the second capability information does not include the CA information or the ENDC information.

13. The method of claim 12, further comprising:
receiving allocation of a resource for carrier aggregation (CA) or E-UTRA NR dual connectivity (ENDC) with respect to wireless communication corresponding to the first SIM from the network; and
not receiving the allocation of the resource for the CA or ENDC with respect to wireless communication corresponding to the second SIM from the network.

14. The method of claim 10, further comprising:
determining the second capability information to be transmitted to the network, wherein at least part of information associated with the data service among information associated with a call service and information associated with the data service, that are capable of being supported by the electronic device, is not included in connection with the second SIM.

15. The method of claim 14, wherein the information associated with the call service includes information associated with VONR supported in a 5G network.

16. The method of claim 10, further comprising:
transmitting an attach request for attaching the electronic device to the network, using each of the first SIM and the second SIM;
receiving an inquiry for a function supported by the electronic device in connection with each of the first SIM and the second SIM from the network in response to the attach request; and
transmitting the first capability information and the second capability information to the network in response to the inquiry.

17. The method of claim 10, further comprising:
receiving an input to change a SIM associated with the data service among the first SIM and the second SIM;
determining the first capability information and the second capability information, based on a setting of a SIM associated with a changed data service in response to the input; and
transmitting the first capability information and the second capability information, to the network.

18. The method of claim 10, wherein the first SIM and the second SIM operate in a DSDS mode.

* * * * *